(12) United States Patent
TeGrotenhuis et al.

(10) Patent No.: US 6,666,909 B1
(45) Date of Patent: Dec. 23, 2003

(54) MICROSYSTEM CAPILLARY SEPARATIONS

(75) Inventors: Ward E. TeGrotenhuis, Kennewick, WA (US); Robert S. Wegeng, Richland, WA (US); Greg A. Whyatt, West Richland, WA (US); Victoria S. Stenkamp, Richland, WA (US); Phillip A. Gauglitz, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/588,871

(22) Filed: Jun. 6, 2000

(51) Int. Cl.$^7$ ............................................. F28D 15/02
(52) U.S. Cl. .................. 95/273; 95/55; 95/56; 55/423; 55/484; 165/60; 165/110; 210/321.75; 210/321.84; 261/104; 261/153; 261/154
(58) Field of Search .................. 95/267, 268, 273, 95/288, 286, 52; 96/409, 414, 421, 7, 11, 4, 9; 55/319, 324, 423, 484; 210/321.75, 321.84; 429/26, 37; 165/60, 110; 261/104, 128, 153, 154

(56) References Cited

U.S. PATENT DOCUMENTS

| | | | |
|---|---|---|---|
| 3,168,137 A | * | 2/1965 | Smith ........................ 165/110 |
| 3,170,512 A | * | 2/1965 | Smith ........................ 165/110 |
| 3,289,752 A | * | 12/1966 | Staub ........................ 165/115 |
| 3,520,803 A | | 7/1970 | Iaconelli |
| 3,563,727 A | | 2/1971 | Webb et al. |
| 3,564,819 A | | 2/1971 | Neulander et al. |
| 3,587,730 A | * | 6/1971 | Milton ........................ 165/110 |
| 3,614,856 A | | 10/1971 | Sanz et al. |
| 3,619,986 A | | 11/1971 | Mormont et al. |
| 3,720,044 A | | 3/1973 | Grove et al. |
| 3,735,562 A | | 5/1973 | Mousseau, Jr. et al. |
| 3,797,202 A | | 3/1974 | Naulander et al. |
| 3,925,037 A | | 12/1975 | Ward, III et al. |
| 3,961,918 A | | 6/1976 | Johnson |
| 4,187,086 A | | 2/1980 | Walmet et al. |
| 4,239,728 A | | 12/1980 | Stenberg et al. |
| 4,715,436 A | * | 12/1987 | Takahashi et al. .......... 165/110 |
| 4,770,238 A | | 9/1988 | Owen |
| 4,903,761 A | | 2/1990 | Cima |
| 4,999,107 A | | 3/1991 | Guerif |
| 5,126,045 A | | 6/1992 | Kohlheb et al. |
| 5,225,080 A | | 7/1993 | Karbachsch et al. |
| 5,453,641 A | | 9/1995 | Mundinger et al. |
| 5,775,410 A | * | 7/1998 | Ramm-Schmidt et al. .. 165/110 |
| 5,800,595 A | * | 9/1998 | Wright ........................ 95/288 |
| 5,919,284 A | * | 7/1999 | Perry, Jr. et al. .............. 95/286 |
| 6,010,554 A | * | 1/2000 | Birmingham et al. ......... 95/267 |
| 6,168,647 B1 | * | 1/2001 | Perry, Jr. et al. .............. 95/268 |
| 6,171,374 B1 | | 1/2001 | Barton et al. |
| 6,332,913 B1 | * | 12/2001 | Breitschwerdt et al. .......... 96/7 |

FOREIGN PATENT DOCUMENTS

| | | |
|---|---|---|
| BR | PI 9702855-0 | 4/1999 |
| WO | WO 98/58743 | 12/1998 |

OTHER PUBLICATIONS

"Studies on Two–Phase Flows at Normal and Microgravity Conditions," Balaktaiah et al., ISSO–INSTITUTE FOR SPACE SYSTEMS OPERATIONS, 1996–1997, retrieved from internet on Mar. 14,2003.

(List continued on next page.)

*Primary Examiner*—Duane Smith
*Assistant Examiner*—Minh-Chan T. Pham
(74) *Attorney, Agent, or Firm*—Frank Rosenberg; Todd J. Harrington

(57) ABSTRACT

Laminated, multiphase separators and contactors having wicking structures and gas flow channels are described. Some preferred embodiments are combined with microchannel heat exchange. Integrated systems containing these components are also part of the present invention.

91 Claims, 12 Drawing Sheets

OTHER PUBLICATIONS

PCT Search Report, mailed Mar. 31, 2003, PCT/US 02/38577.

PCT International Search Report.

Buxbaum, R., "*Membrane Reactors, Fundamental and Commercial Advantages, E.G. For Methanol Reforming.*" p. 1–6. No Year.

Dean, WC., "*Zero Gravity Phase Separator Technologies—Past, Present and Future.*" p. 1–7, 1992.

Gillis, EA., "*Fuel Cells For Electric Utilities.*" p. 88–93, 1980.

Muraoka, I. et al., "*Experimental and Theoretical Investigation of a Capillary Pumped Loop With a Porous Element in the Condenser.*" p. 1085–1094. 1998.

Seok, DR. et al., "*Zero–Gravity Distillation Utilizing the Heat Pipe Principle (Micro–Distillation).*" p. 2059–2065. 1985.

Smith, R. et al., "*Process Integration of Separation Systems.*" p. 161–174. No Year.

Vasiliev, LL. et al., "*High–Efficient Condenser with Porous Element.*" p. 1–5. 1991.

\* cited by examiner

■ – Regions cut all the way through the shim
⊠ – Regions cut all the way through the containing wick structure
☐ – Partially cut through the shim
▨ – Lands in flow path (not cut)

MICROSYSTEM CAPILLARY SEPARATIONS

This invention was made with Government support under Contract DE-AC0676RLO1830 awarded by the U.S. Department of Energy. The Government has certain rights in the invention.

FIELD OF THE INVENTION

The present invention relates to processes and devices that utilize capillary forces to separate fluids. Several of the inventive embodiments are limited to microcomponent or microchannel devices that utilize capillary forces.

BACKGROUND OF THE INVENTION

Compact systems for capturing and/or separating fluids are desirable in a variety of applications. For example, hydrogen-powered vehicles could utilize fuel cells that recycle water. As another example, efficient and lightweight systems for recovery and reuse of water in spacecraft has long been recognized as a requirement for human space exploration. The present invention provides methods and apparatus for efficient fluid capture and separation.

SUMMARY OF THE INVENTION

The invention provides methods and apparatus for separating fluids and/or heat exchange. One process separates fluids by passing a mixture of at least two fluids, comprising a first fluid and a second fluid, into a device having at least one channel. The channel has an open area and a wicking region. The first fluid is either a liquid (such as a droplet or liquid particle) that is sorbed by the wicking region, or a gas that, under separation conditions, forms a liquid in the wicking region. The first liquid travels through the wicking region to a liquid flow channel and then exits the device through a liquid exit channel. The second fluid is a gas that passes through the gas flow channel to a gas exit, and exits the device through the gas exit.

The invention also provides a process of contacting fluids in which at least two fluids are passed into a device having at least one channel. The channel has an open area and a wicking region and an interface between the wicking region and the open area. During operation, at least one fluid flows through the wicking region, and at least one other fluid flows through the open area. At the interface between the wicking region and the open area, one fluid contacts at least one other immiscible fluid, and there is mass transfer occuring through the interface between the at least one fluid flowing through the wicking region, and the at least one other fluid flowing through the open area.

The invention further provides a method of condensing a liquid in which a gas passes into a device having at least one channel. The channel has an open area and a wicking region and is in thermal contact with at least one microchannel heat exchanger; and a heat exchange fluid is passed through the microchannel heat exchanger(s). During operation heat is removed from the gas stream causing some part to condense to form a liquid. Said formed liquid is sorbed into the wicking region, travels through the wicking region to a liquid flow channel and then exits the device through a liquid exit channel.

The invention further provides an apparatus having at least one channel comprising an open area and a wick. The wick in the channel is connected to an exit wick, and the open area is connected to a gas exit. This apparatus is useful for many of the processes described herein.

The invention also provides a liquid condenser comprising at least one channel; wherein the channel comprises a gas flow channel and a wick. The channel is in thermal contact with at least one microchannel heat exchanger. Both the apparatus and condenser are particularly well suited for use in a chemical reactor.

The presence of wicks and optional pore throats and capture structures are common to multiple embodiments of the invention. A wick is a material that will preferentially retain a wetting fluid by capillary forces and through which there are multiple continuous channels through which liquids may travel by capillary flow. The channels can be regularly or irregularly shaped. Liquid will migrate through a dry wick, while liquid in a liquid-containing wick can be transported by applying a pressure differential, such as suction, to a part or parts of the wick. The capillary pore size in the wick can be selected based on the contact angle of the liquid and the intended pressure gradient in the device, and the surface tension of the liquid. Preferably, the pressure at which gas will intrude into the wick should be greater than the pressure differential across the wick during operation-this will exclude gas from the wick.

The liquid preferentially resides in the wick due to surface forces, i.e. wettability, and is held there by interfacial tension. The liquid prefers the wick to the gas channel and as long as there is capacity in the wick, liquid is removed from the gas stream and does not leave in the gas stream.

The wick can be made of different materials depending on the liquid that is intended to be transported through the wick. The wick could be a uniform material, a mixture of materials, a composite material, or a gradient material. For example, the wick could be graded by pore size or wettability to help drain liquid in a desired direction. Examples of wick materials suitable for use in the invention include: sintered metals, metal screens, metal foams, polymer fibers including cellulosic fibers, or other wetting, porous materials. The capillary pore sizes in the wick materials are preferably in the range of 10 nm to 1 mm, more preferably 100 nm to 0.1 mm, where these sizes are the largest pore diameters in the cross-section of a wick observed by scanning electron microscopy (SEM). In a preferred embodiment, the wick is, or includes, a microchannel structure. Liquid in the microchannels migrates by capillary flow. The microchannels can be of any length, preferably the microchannels have a depth of 1 to 1000 micrometers ($\mu$m), more preferably 10 to 500 $\mu$m. Preferably the microchannels have a width of 1 to 1000 $\mu$m, more preferably 10 to 100 $\mu$m. In a preferred embodiment, the microchannels are microgrooves, that is, having a constant or decreasing width from the top to the bottom of the groove. In another embodiment, the microchannels form the mouth to a larger diameter pore for liquid transport.

The wick is preferably not permitted to dry out during operation since this could result in gas escaping through the wick. One approach for avoiding dryout is to add a flow restrictor in capillary contact with the wick structure, such as a porous structure with a smaller pore size than the wick structure and limiting the magnitude of the suction pressure such that the non-wetting phase(s) cannot displace the wetting phase from the flow restrictor. This type of restrictor is also known as a pore throat. In preferred embodiments, a pore throat is provided between the wick and the liquid flow channel and/or at the liquid outlet. In some embodiments, the wick can have a small pore diameter such that is serves to transport fluids from the gas channel and also prevents gas intrusion, thus serving the dual purpose of a wick and a pore throat.

A pore throat has a bubble point that is greater than the maximum pressure difference across the pore throat during operation. This precludes intrusion of gas into the pore throat due to capillary forces (surface tension, wettability, and contact angle dependent). The pore throat should seal the liquid exit, so there should be a seal around the pore throat or the pore throat should cover the exit in order to prevent gas from bypassing the pore throat. The pore throat is preferably very thin to maximize liquid flow through the pore throat at a give pressure drop across the pore throat. Preferably, the pore throat has a pore size that is less than half that of the wick and a thickness of 50% or less than the wick's thickness; more preferably the pore throat has a pore size that is 20% or less that of the wick. Preferably, the pore throat is in capillary contact with the wicking material to prevent gas from being trapped between the wick and the pore throat and blocking the exit.

Flooding can result from exceeding the flow capacity of the device for wetting phase through the wick; the flow capacity is determined by the pore structure of the wick, the cross-sectional area for flow, or the pressure drop in the wick in the direction of flow.

A capture structure can be inserted (at least partly) within the gas flow channel, and in liquid contact with the wick. The capture structure assists in removing (capturing) a liquid from the gas stream. One example of a capture structure are cones that protrude from the wick; liquid can condense on the cones and migrate into the wick—an example of this capture structure is shown in U.S. Pat. No. 3,289,752, incorporated herein by reference. Other capture structures include inverted cones, a liquid-nonwetting porous structure having a pore size gradient with pore sizes getting larger toward the wick, a liquid-wetting porous structure having a pore size gradient with pore sizes getting smaller toward the wick and fibers such as found in commercial demisters or filter media. Mechanisms for capturing dispersed liquid particles include impingement (due to flow around obstructions), Brownian capture (long residence time in high surface area structure), gravity, centrifugal forces (high curvature in flow), or incorporating fields, such as electrical or sonic fields, to induce aerosol particle motion relative to the flow field.

Nonwetting surfaces can be disposed on the gas flow channel walls. These nonwetting surfaces can help prevent formation of a liquid film on the surface and, in combination with a wick or a wick and capture structure the liquid present in a fluid mixture can be siphoned away from the condensing surface by capillary flow, thereby avoiding problems associated with dropwise condensation, such as cold spots or re-entrainment.

The invention, in various aspects and embodiments can provide numerous advantages including: rapid mass transport, high rates of heat transfer, low cost, durability, and highly efficient liquid separations in a compact space.

Devices and processes of the present invention are capable of integrating high efficiency, high power density heat exchange. Heat exchange can facilitate phase changes within the separation device, such as condensation and evaporation. One example is partial condensation of a gas stream to recover condensable components, such as water from the cathode waste gas stream from a fuel cell. Another optional feature is reduced or non-wettability of the wall adjacent to a heat exchange surface to preclude formation of a liquid film. The heat transfer coefficient would increase substantially by avoiding the resistance of a liquid film.

The embodiments show preferred embodiments in which there are multiple gas flow channels operating in parallel. This configuration allows high throughput and provides a large surface area to volume ratio for high efficiency. In some preferred embodiments, layers are stacked to have between 2 and 600 separate gas flow channels, more preferably between 4 and 40 gas flow channels. As an alternative to the parallel arrangement, the channels could be connected in series to create a longer flow path.

Another advantageous feature of some preferred embodiments of the invention is that the gas flow channels and/or liquid flow channels are essentially planar in the fluid separation regions. This configuration enables highly rapid and uniform rates of mass and heat transport. In some preferred embodiments, the gas flow channels and/or liquid flow channels have dimensions of width and length that are at least 10 times larger than the dimension of height (which is perpendicular to net gas flow).

The subject matter of the present invention is distinctly claimed in the concluding portion of this specification. However, both the organization and method of operation, together with further advantages and objects thereof, may further be understood by reference to the following description taken in connection with accompanying drawings wherein like reference characters refer to like elements.

GLOSSARY OF TERMS

A "capture structure" is a structure disposed (at least partly) within a gas flow channel that assists movement of a liquid into the wick.

A "cell" refers to a separate component, or an area within an integrated device, in which at least one unit operation is performed. In preferred embodiments, the cell has a width less than about 20 cm, length less than about 20 cm, and height less than about 3 cm.

"Device volume" refers to the entire volume of the device, including channels, headers, and shims.

"Entrainment" refers to transport of liquid into the gas exit.

"Flow microchannel" refers to a microchannel through which a fluid flows during normal operation of an apparatus.

A "laminated device" is a device having at least two nonidentical layers, wherein these at least two nonidentical layers can perform a unit operation, such as heat transfer, condensation, etc., and where each of the two nonidentical layers are capable having a fluid flow through the layer. In the present invention, a laminated device is not a bundle of fibers in a fluid medium.

A "liquid" is a substance that is in the liquid phase within the wick under the relevant operating conditions.

"Microchannel" refers to a channel having at least one dimension of 5 mm or less. The length of a microchannel is defined as the furthest direction a fluid could flow, during normal operation, before hitting a wall. The width and depth are perpendicular to length, and to each other, and, in the illustrated embodiments, width is measured in the plane of a shim or layer.

"Microcomponent" is a component that, during operation, is part of a unit process operation and has a dimension that is 1 mm or less.

"Microcomponent cell" is a cell within a device wherein the cell contains microcomponents.

"Pore throat" refers to a porous structure having a maximum pore dimension such that a non-wetting fluid is restricted from displacing a wetting fluid contained with the pore throat under normal operating conditions.

"Residence time" refers to the time that a fluid occupies a given working volume.

"Unit process operation" refers to an operation in which the chemical or physical properties of a fluid stream are modified. Unit process operations (also called unit operations) may include modifications in a fluid stream's temperature, pressure or composition.

A "wicking region" is the volume occupied by a wick, or, a wicking surface such as a grooved microchannel surface.

"Working volume" refers to the total channel volume of the device, and excludes the headers and solid shim and end plate materials.

DETAILED DESCRIPTION

Figure 1:
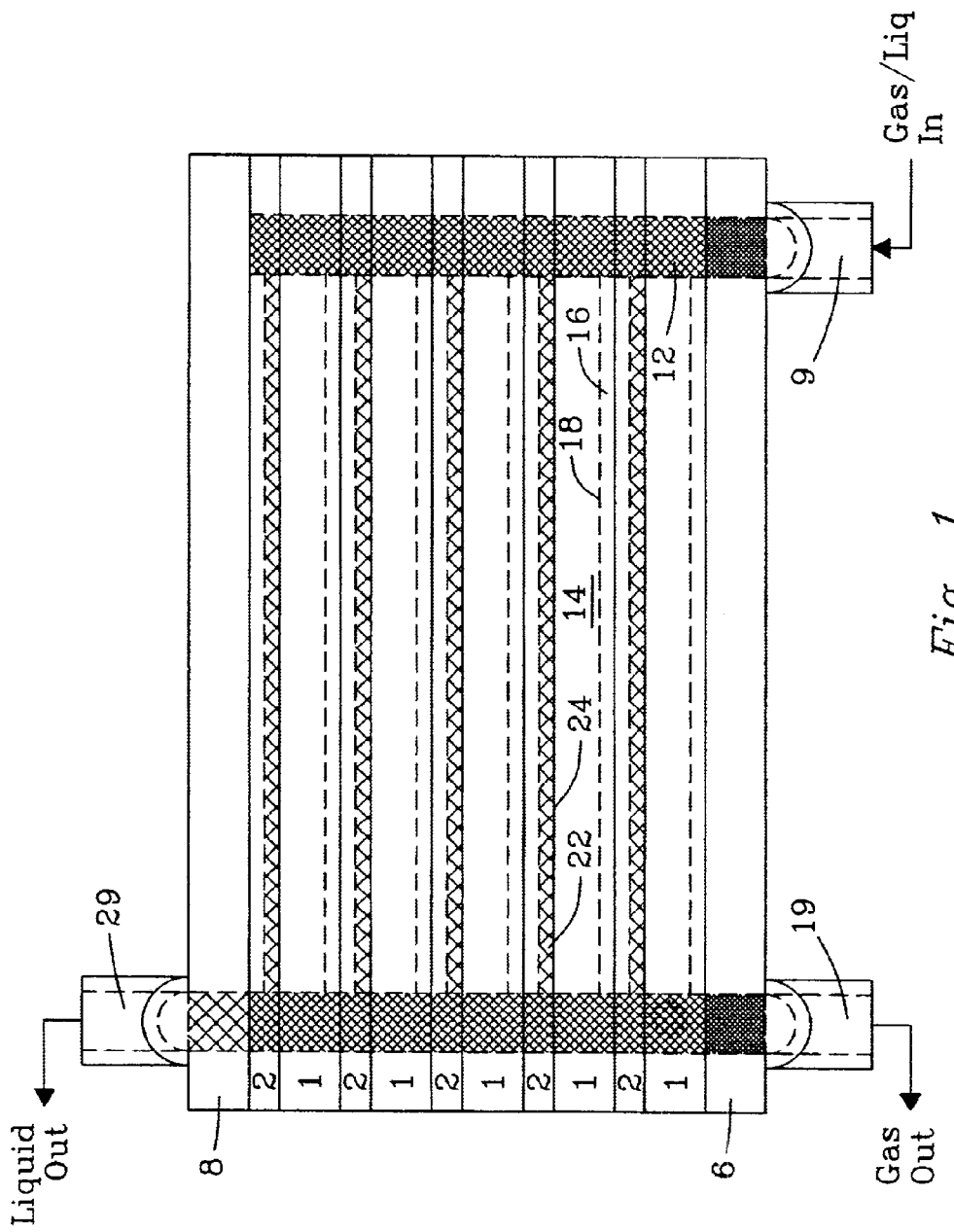
FIG. 1 is a cross-sectional view of a gas/liquid separator.

In a first aspect, the invention provides a gas/liquid separator. An embodiment of on such device is illustrated in FIG. 1. The illustrated device is made up of end plates 6, 8 and alternating central shims 1 and 2. A fluid inlet 9 is connected to open channel 12. Shim 1 has open gas flow channels 14. The surface 18 of solid section 16 forms the bottom of the gas flow channel. The top of the gas flow channel is formed wick 22 of shim 2. As the gas/liquid mixture flows through channel 14, the liquid component is absorbed by the wick 22. The liquid in the wick travels to a wick exit channel and flows out through liquid outlet 29. To remove liquid suction can be applied through a pump (not shown). Gas flows out through a separate channel and out through gas outlet 19.

Figure 2:
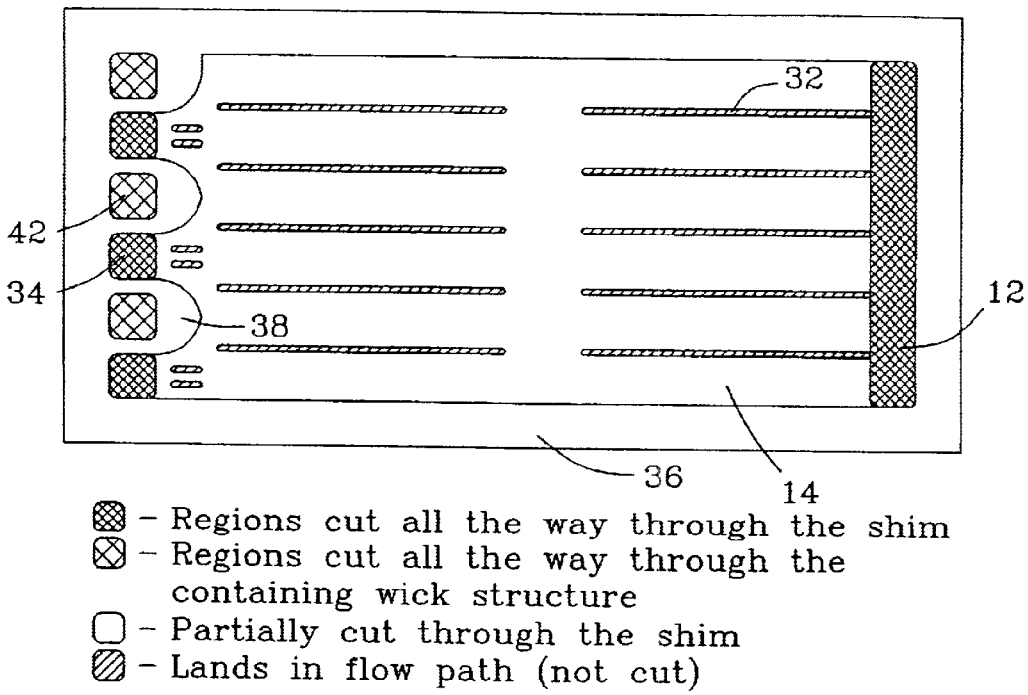
FIG. 2 is a top-down view of a gas flow channel layer of the gas/liquid separator.

A top down view of shim 1 is illustrated in FIG. 2. Channels 14 are separated by lands 32. The lands can support a wick insert and prevent channel collapse during fabrication. Gas flows through channels 14 and into gas exit holes 34. Lands 32 are preferably the same height as edges 36. The height of the gas flow channels 14, from surface 18 to wick surface 24 is preferably about 10 $\mu$m to 5 mm, more preferably 100 $\mu$m to 1 mm. The height of the channels is preferably small for good heat and mass transfer and overall device size, balanced against potentially slower flow rates. The path to exit wicks 42 can be blocked by lands 38. A high ratio of surface area of exposed wick to volume of gas flow channel is desirable for efficient phase separations. Preferably this ratio is from 1 to 1000 $cm^2:cm^3$, more preferably from 5 to 100.

Figure 3:
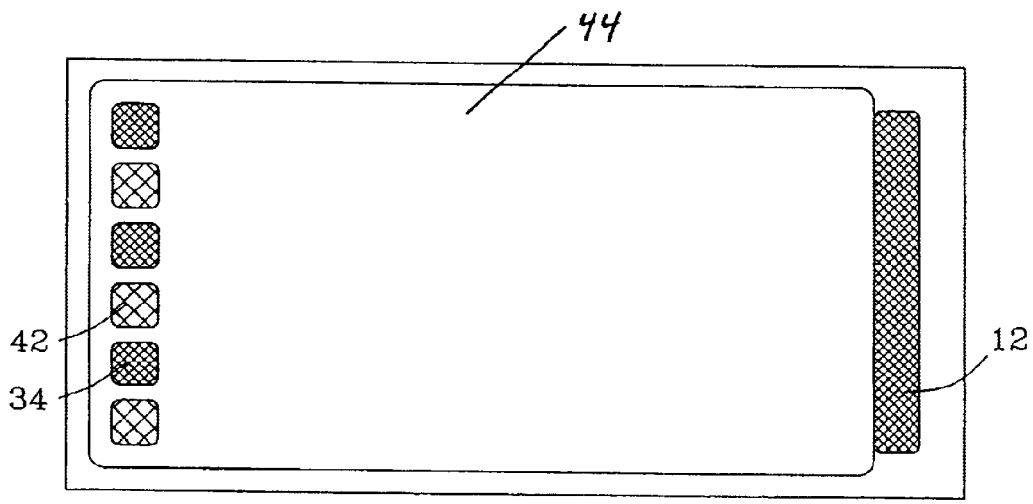
FIG. 3 is a bottom-up view of a liquid flow channel layer of the gas/liquid separator.

A bottom up view of shim 2 (without wick) is illustrated in FIG. 3. It includes gas exit holes 34 (open space) and exit wicks 42. A wick (not shown) may be inserted open space 42 (preferably without blocking hole 12). Alternatively, surface of the shim can be a wick structure such as microchannels. In any event, the wick structure should create a continuous liquid flow path with exit wick 42, but should not block gas exit holes 34.

Figure 4:
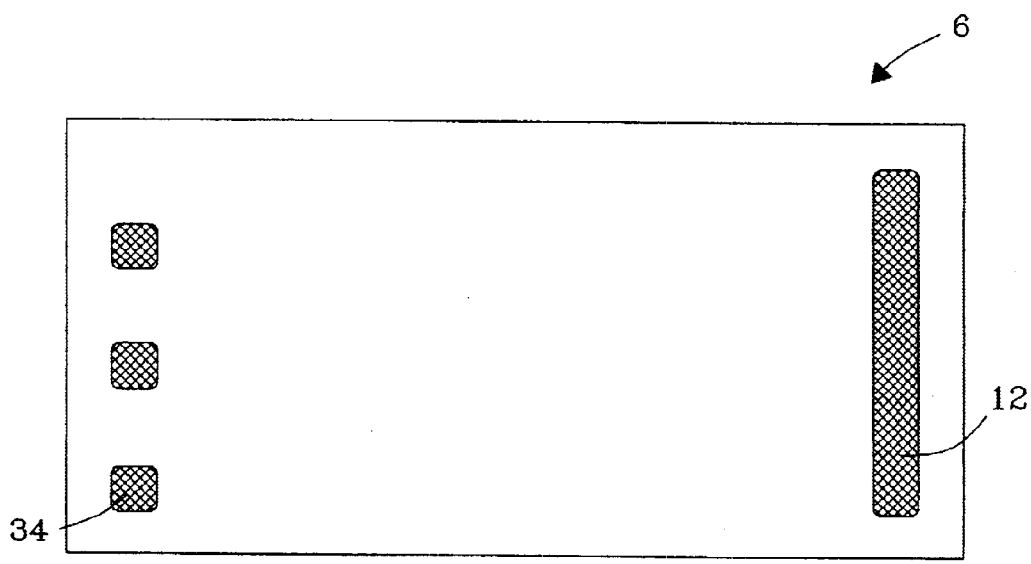
FIG. 4 is a top-down view of an end plate of the gas/liquid separator.
Figure 5:
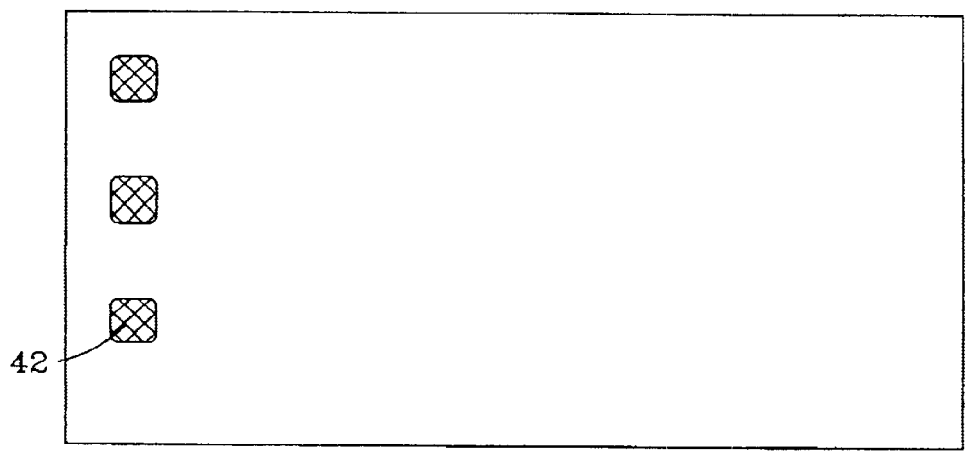
FIG. 5 illustrates the other end plate of the gas/liquid separator.

FIG. 4 illustrates a top down view of end plate 6 showing spaces for gas/liquid entry 12 and gas exit holes 34. FIG. 5 illustrates end plate 8 with exit wicks 42. Of course, the device could be plumbed to have gas and liquid exit from the same side or the gas/liq entry could be moved to the opposite end plate 8 to have liquid exit and gas/liq entry on the same side of the device.

In operation of a device with a wick, the wick should not be flooded, and it is preferably not dry. A wet or saturated wick will effectively transport liquid through capillary to a low pressure zone, such as low pressure created by suction. A pore throat may be added to liquid outlet 27 to prevent gas flow out of liquid exit.

Figure 6:
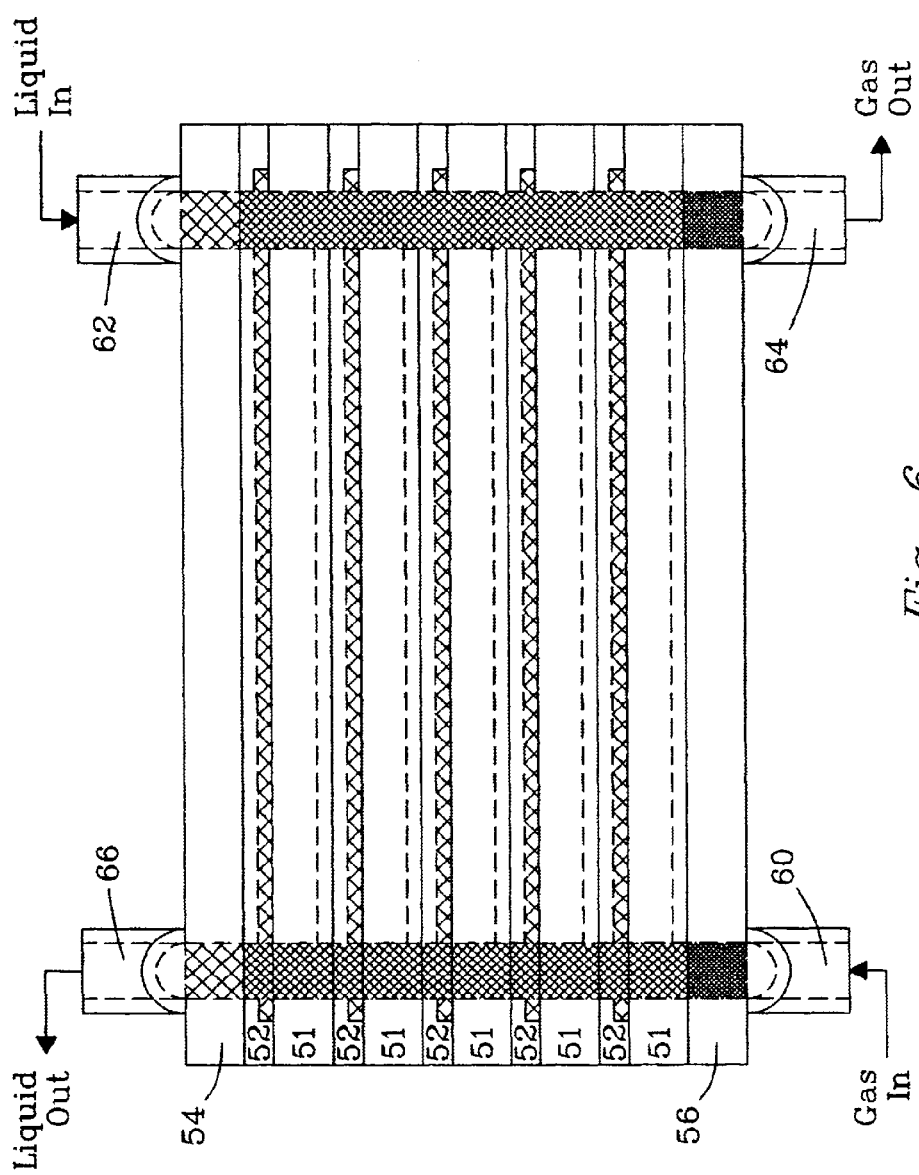
FIG. 6 is a cross-sectional view of a gas/liquid contactor.
Figure 7:
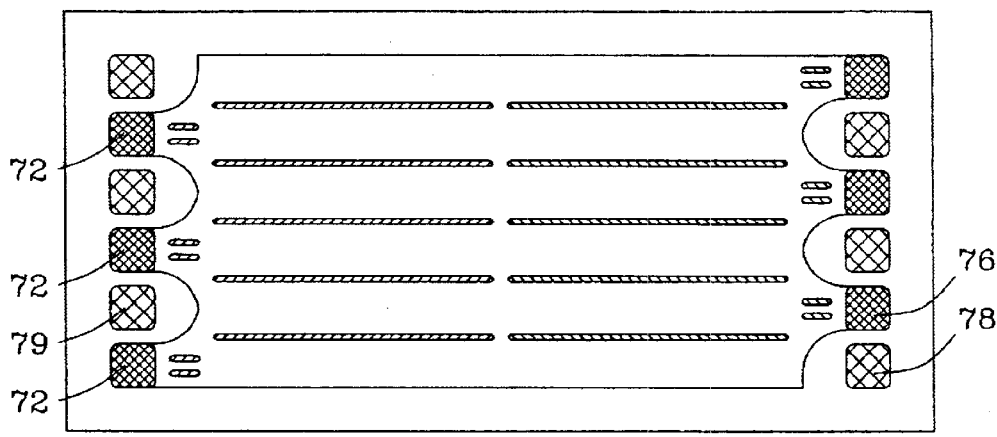
FIG. 7 is a top-down view of a gas flow channel layer of the gas/liquid contactor.
Figure 8:
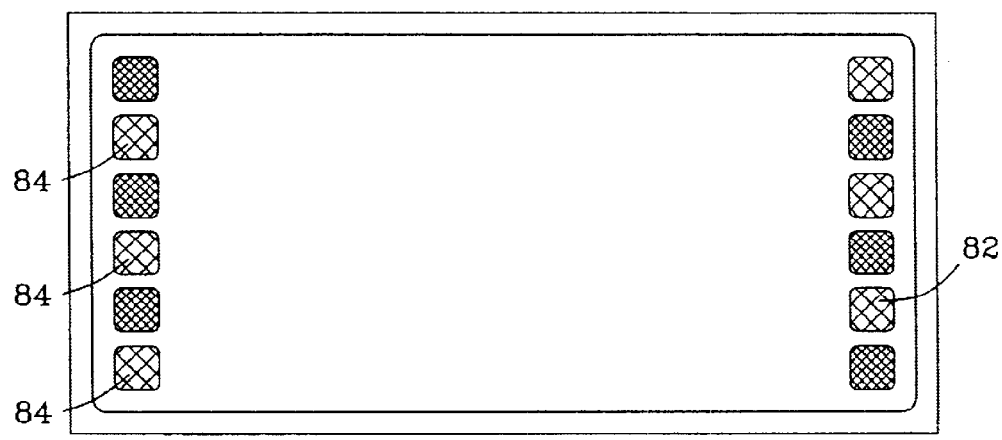
FIG. 8 is a bottom-up view of a liquid flow channel layer of the gas/liquid contactor.
Figure 9:
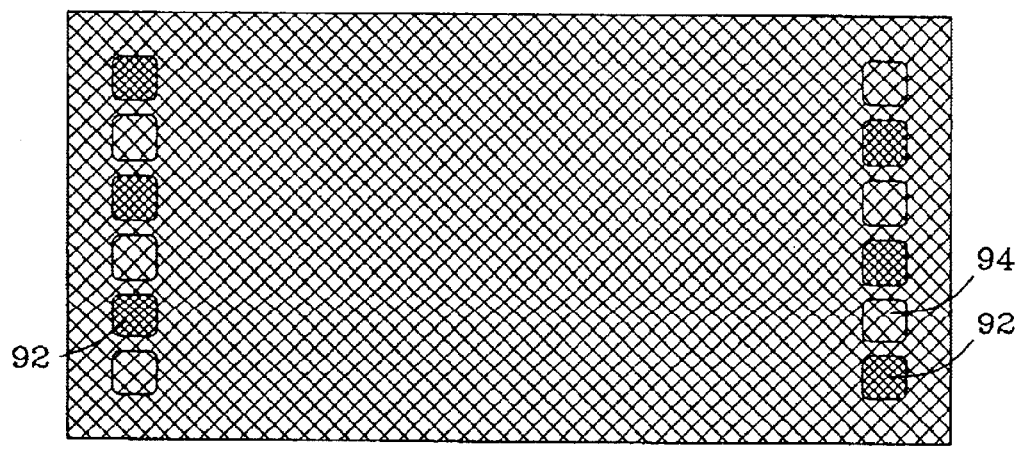
FIG. 9 illustrates a wick insert.

A cross-sectional view of a gas/liquid contactor is illustrated in FIG. 6. This contactor has end plates 54 and 56 and alternating shims 51 and 52. T-joint inlets 60 and 62 are for the passage of gas and liquid respectively. T-joint outlets 64 and 66 are for the passage of gas and liquid respectively. A top-down view of shim 51 is illustrated in FIG. 7. Gas flows in through gas inlet holes 76 and out through outlet holes 72. A bottom-up view of shim 52 is illustrated in FIG. 8. Liquid flows in through wick channels 82 through the wick and out through wick channels 84. A wick insert is illustrated in FIG. 9. The wick insert has through holes 92 for gas flow through the wick. Regions 94 of the insert can be continuous wick or can be holes that are filled with a continuous wick through the wick channels. Where the wick insert covers regions 94, disks or other inserts of a wicking material should be disposed in channels 78, 79, 82 and 84 to provide a continuous capillary liquid flow path. Use of microchannels in shim 52 can obviate the need for a wick insert. Endplate 54 has wick channels (not shown) corresponding to the wick channels in shim 52. Endplate 56 has gas inlet and outlet holes (not shown) corresponding to inlet and outlet holes 72 and 76. This device illustrates a preferred counterflow of liquid and gas phases. Where the liquid is used to selectively absorb components from the gas phase, the counterflow construction contacts the gas with the lowest concentration of extractable components with the purest liquid and thus provides for maximal absorbtion of the gas components.

Figure 10:
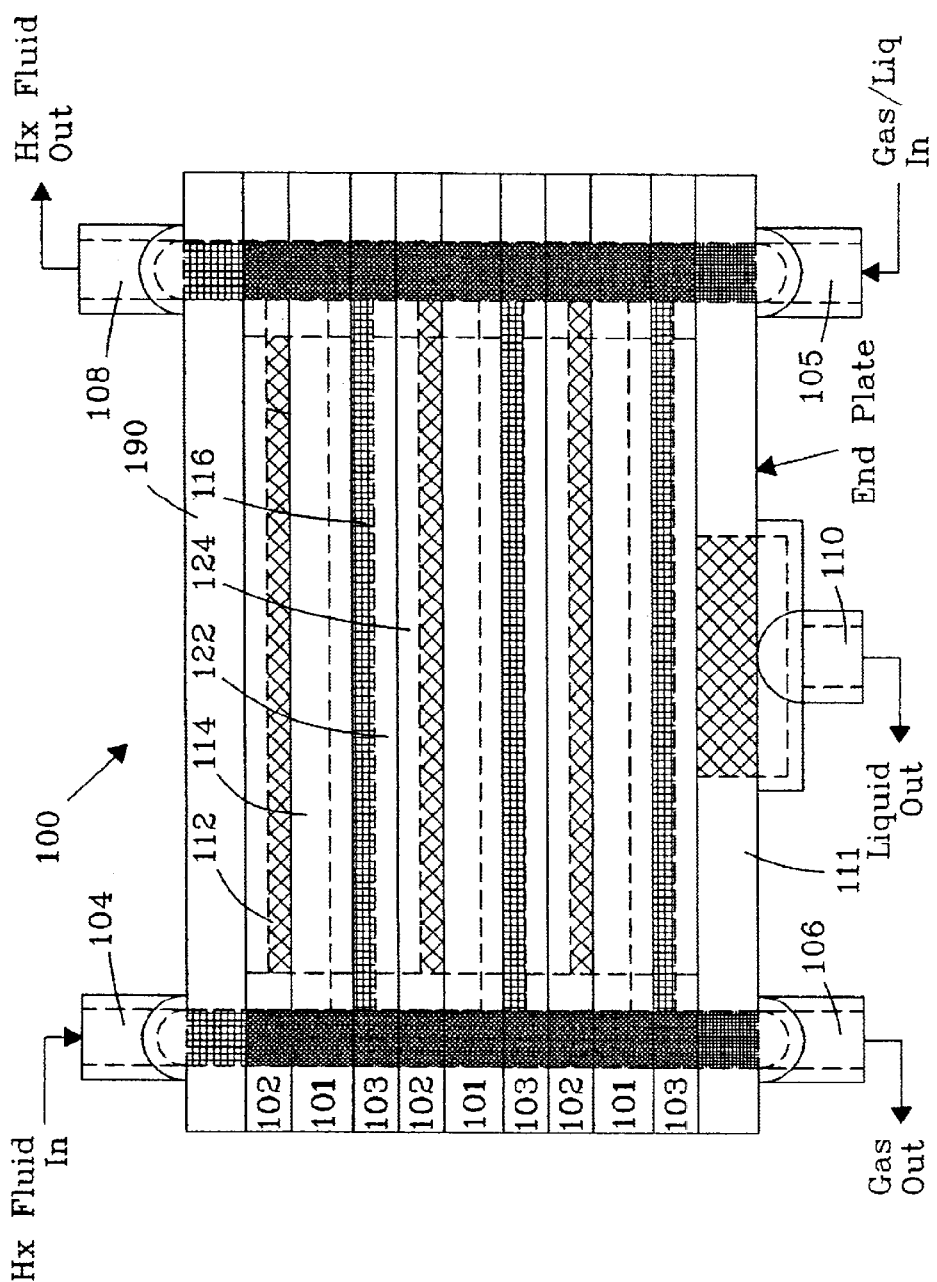
FIG. 10 is a cross-sectional view of a counter-current heat exchange condensor assembly.

A cross-sectional view of a counter flow heat exchange condenser assembly 100 is illustrated in FIG. 10. The assembly includes shims 101, 102, and 103, inlets 104 and 105, and outlets 106, 108, and 110. Shim 102 includes wick 112 and wall 124. Shim 101 has gas flow channels 114 and walls 126. Heat exchanger shim 103 contains microchannels 166 and wall 122.

Figure 11:
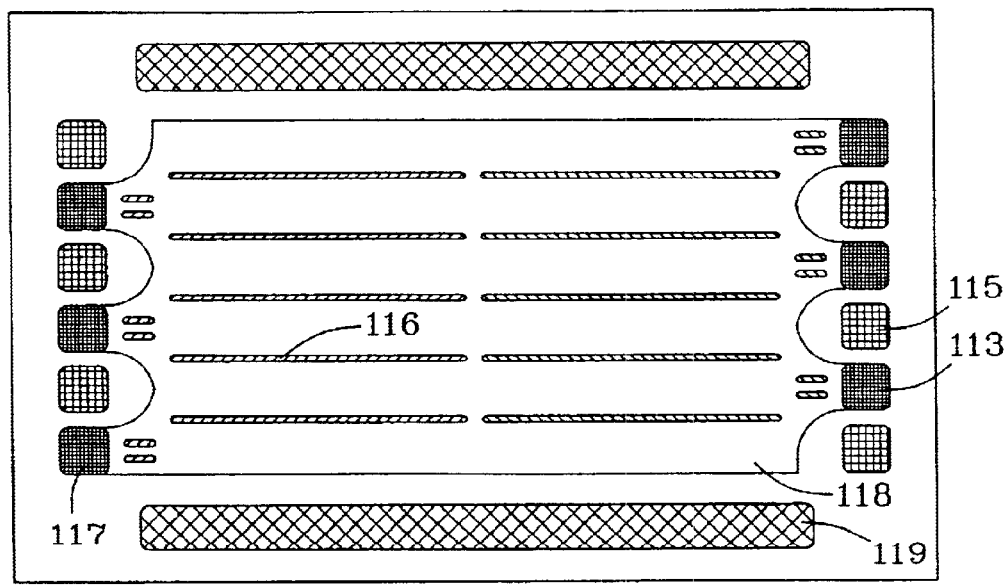
FIG. 11 is a top-down view of a gas flow channel layer of the counter-current heat exchange condensor assembly.

A top down view of shim 101 is illustrated in FIG. 11. The illustrated shim contains gas flow channels 118, fluid flow inlets 113, lands 116, gas exit holes 117, heat exchange fluid holes 115, and liquid exit hole 119.

Figure 12:
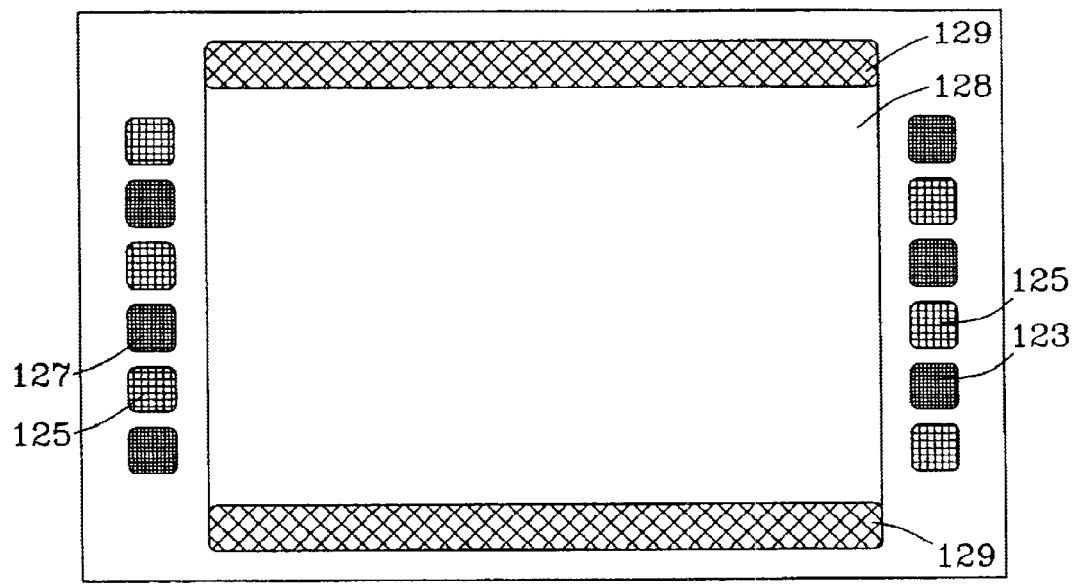
FIG. 12 is a bottom-up view of a liquid flow channel layer of the counter-current heat exchange condenser assembly.

FIG. 12 illustrates a bottom up view of shim 102. The illustrated shim includes liquid flow channel 128, fluid flow inlets 123, gas exit holes 127, heat exchange fluid holes 125, and liquid exit hole 129.

Figure 13:
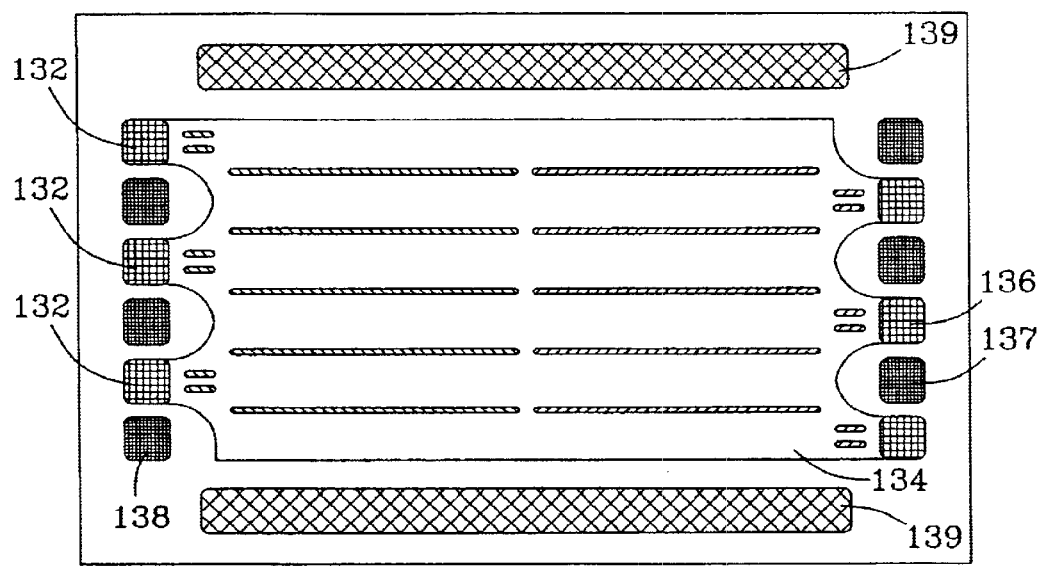
FIG. 13 is a top-down view of a heat exchange layer of the counter-current heat exchange condensor assembly.
Figure 14:
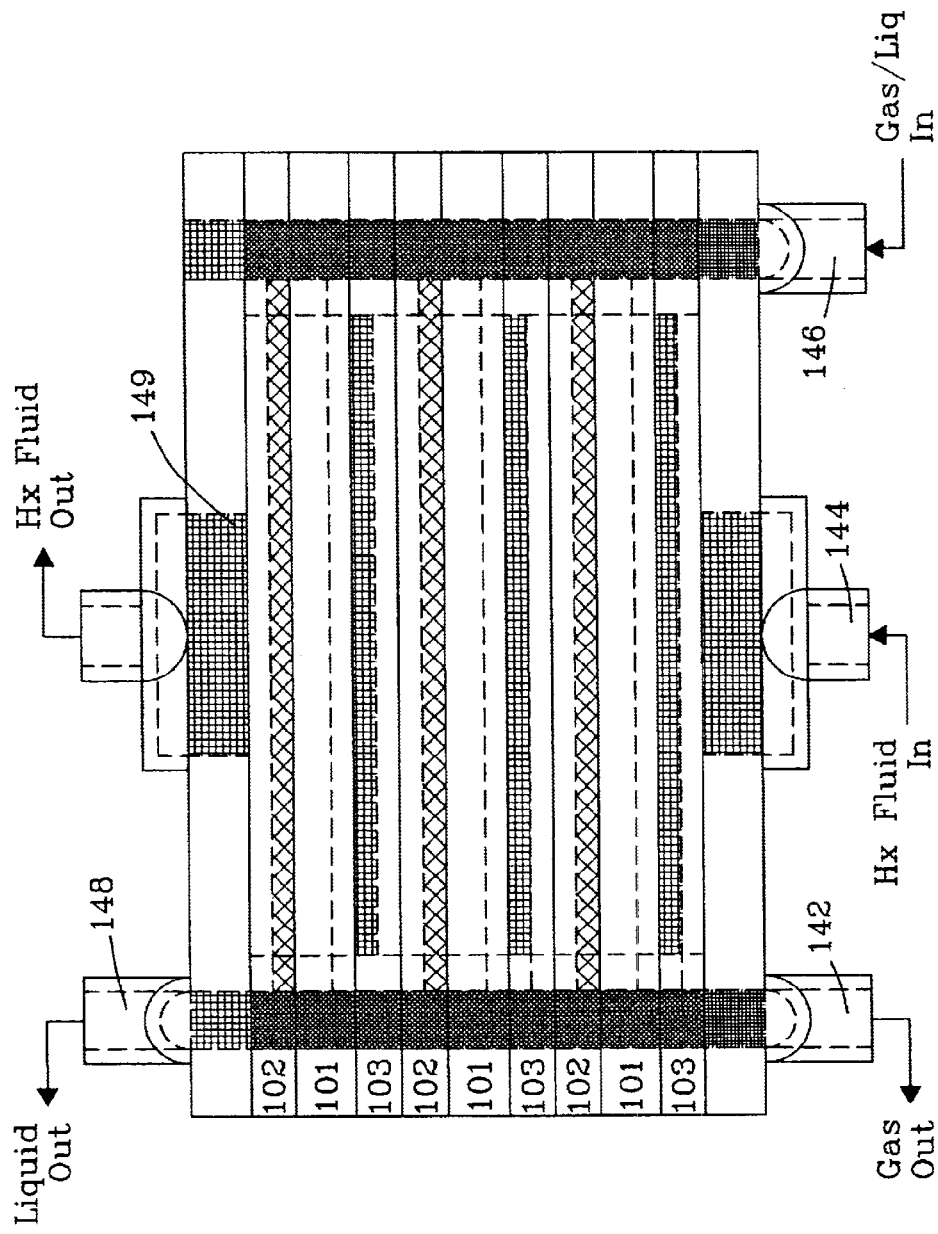
FIG. 14 is a cross-sectional view of a cross-current heat exchange condensor assembly.
Figure 15:
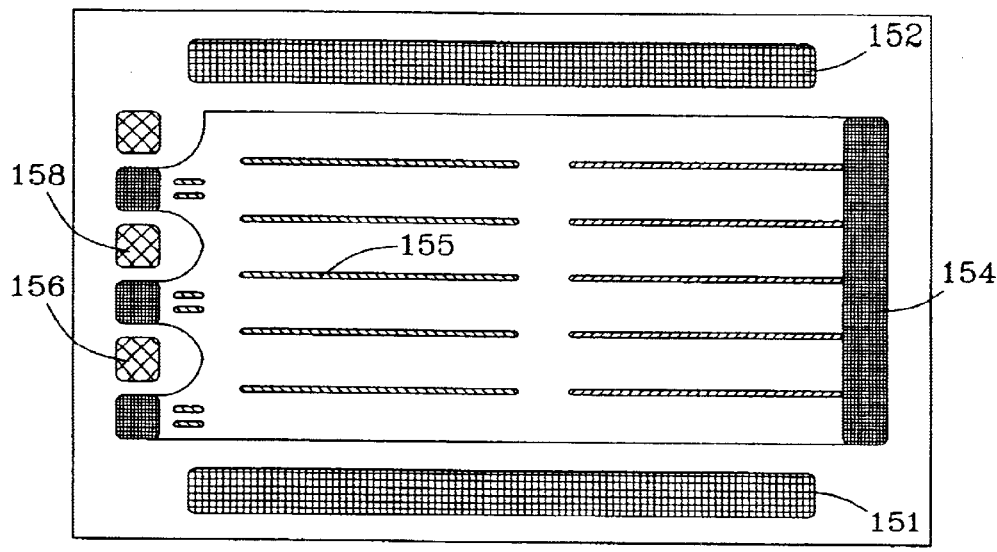
FIG. 15 is a top-down view of a gas flow channel layer of the cross-current heat exchange condensor assembly.
Figure 16:
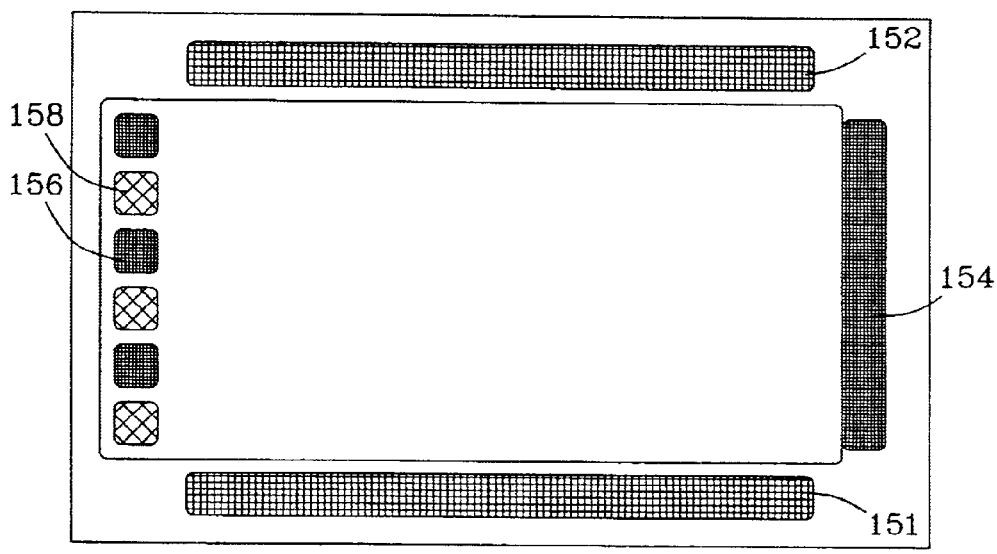
FIG. 16 is a bottom-up view of a liquid flow channel layer of the cross-current heat exchange condensor assembly.
Figure 17:
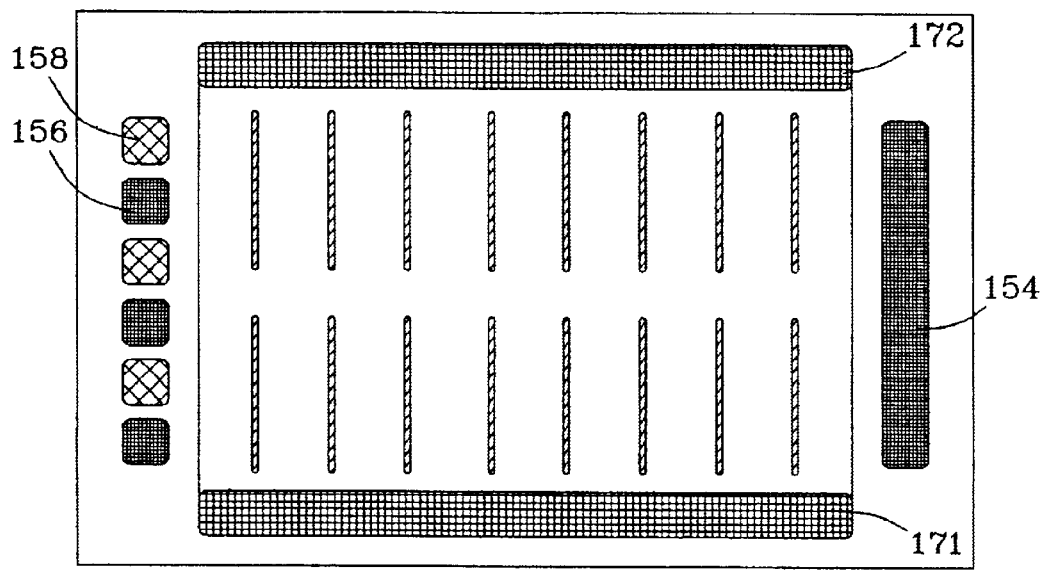
FIG. 17 is a top-down view of a heat exchange layer of the cross-current heat exchange condensor assembly.

A top down view of a heat exchange shim is illustrated in FIG. 13. The heat exchange fluid enters through holes 132, travels through microchannels 134 and exits through holes 136. Passageways 137, 138, and 139 are provided for fluid mixture, gas and liquid to flow through the heat exchange shim.

Endplate 190 has inlet and outlet holes for the heat exchange fluids. End plate 111 has fluid inlet holes, gas outlet holes, and liquid exit holes.

During operation, a fluid mixture can enter through inlet 105 and pass through gas flow channels 114. A heat exchange fluid enters through inlet 104 and passes through microchannel layer 116. In a preferred embodiment, one component of the fluid mixture condenses in wick 112. Heat can be removed from (or added to) the system by the heat exchange fluid. Depending on system requirements, either wall 101 or walls 122, 124 can be insulating. In a preferred embodiment, the layers (shims) are arranged to have the repeating sequence: wick, gas flow channel, wall, microchannel layer, wall, gas flow channel, and wick.

A cross-current heat exchange assembly is illustrated in FIGS. 14–17. The gas and liquid inlets and outlets and the lands are indicated using the same shadings as above. In this embodiment, the heat exchange fluid runs cross-current (at a right angle) to the flow of fluid through the gas flow channel.

The figures illustrate preferred embodiments in which liquid flows by direct contact of the wick in the liquid flow channels to a wick in the liquid exit channels. In other embodiments, however, the liquid, after having been sorbed into the wick, can flow into a liquid flow channel that does not contain a wick. The liquid can then flow out through wicks or by fluid flow without wicks.

The shims can be made of metals, plastics, ceramic or composite materials. Metal shims can be made by etching, conventional cutting and machining, electrical discharge machining (EDM), laser machining, stamping, or molding techniques. Plastic shims can be made using the same techniques or by conventional plastic forming techniques, including injection molding, hot embossing, stamping, casting, and other molding techniques. Ceramic shims could be made using techniques well known for fabricating ceramic parts, including those used in fabricating solid oxide fuel cell elements. The shim material facing the gas channel can be made hydrophobic through coatings, treatment or by the choice of material. The end plates are preferably made of a similar material as the shims and made using similar techniques. The shims are stacked with wicks installed within the liquid flow channel, either held in loosely by the lands and channel walls or by adhering the wicks to the liquid channel wall. The wick or pore throat must prevent an open path for the gas to flow to the liquid exit. This is accomplished either by close tolerances between the wick or pore throat structure and the walls, by using a sealant, such as epoxy to install the wick or pore throat, or through the use of gaskets or o-rings. End plates are then placed on the top and bottom of the shim stack. The seams between shims and between end plates and shims are either sealed by bonding or by a compression seal. Bonding can be accomplished by diffusion bonding, by chemical reaction, such as using an epoxy resin, or by gluing with an adhesive material. A compression seal can be accomplished using gaskets, O-rings, or by surface to surface contact and bolting the device together. Inlets and outlets can be connected by the same methods, by welding, by screws or bolts, or by other known connection techniques.

When making low volumes of a given device or when the device needs to be disassembled for cleaning or modifications, the preferred fabrication technique is to fabricate the shims and end plates by conventional machining, such as by milling. Seals between the shims and end plates are preferably accomplished by compression seals using either O-rings placed in grooves machined into one of the sealing surfaces or by using a gasket material cut to match the profile of the sealing surface. The device is then held together in compression using bolts. The liquid exit is isolated from the gas flow channel using gaskets or sealant, such as epoxy, between the wick or pore throat and the wall. Inlets and outlets can be installed using standard threaded fittings or other known connection techniques.

The devices and processes described herein are especially desirable for integration in a system. These systems can accomplish desired functions such as heat transfer, mass transfer, heterogeneous reaction, electrochemical reactions, or electric field enhancements. When integrated as an element in a chemical reactor, the inventive devices can result in process intensification (e.g., reduced mass transport residence times) and/or greater than equilbrium conversion and selectivity for chemical reactions. Combination with a heat exchanger can facilitate multi-phase endothermic or exothermic chemical reactions.

Heterogeneous catalytic reactions can also be accomplished within the proposed architecture by impregnating active catalyst materials in the wicking structure for liquid phase reactions and/or in the capture structure for gas phase reaction. One example is Fischer-Tropsch synthesis, where condensable hydrocarbons are produced. Reactor residence time can be reduced by the incorporation of structures that remove liquid hydrocarbon products in contact with the catalyst structure. The devices can also be used in an integral reactor-chemical separator. For example, the wick or an absorbent material within the wick can selectively remove one of the products. This causes a shift in the equilbrium conversion as well as improved selectivity. Other, nonlimiting, examples include low temperature water gas shift reaction, where we believe that selectively removing CO could lower the operating temperature for achieving adequate conversion. This effect could be enhanced by flowing an absorbent liquid countercurrent to a flowing gas stream.

EXAMPLES

Example 1

Half inch polycarbonate was machined to create a 3000 $\mu$m deep×2 cm wide×8 cm long channel. An ⅛" NPT barbed fitting placed 1 cm from the end of the channel served as the liquid outlet. A 2 cm×8 cm piece of 70×70 stainless steel mesh available from McMaster Carr was placed in the channel beneath a ¹⁄₁₆"×2 cm×8 cm piece of sintered nickel with 5 □m pores (Mott Corporation). The sintered nickel was sealed into place using Loctite® RTV silicone adhesive.

A 0.25" piece of polycarbonate was machined so that two ⅛" NPT barbed fittings could be threaded into holes 6 cm apart. This piece of polycarbonate had been made hydrophobic by treatment in a capacitively coupled RF (13.56 MHz) plasma reactor (66×66×91cm$^3$) using two stainless steel parallel electrodes (25 cm in diam.). The electrodes were separated by a distance of 10 cm, and were both water-cooled. The RF power was applied to the upper electrode, and the sample was placed on the lower, grounded electrode. An automatic L-type matching network with two air variable capacitors converted the complex impedance of plasmas to 50 resistivity. A dc self-bias meter with selectable scaling allowed precise control over the matching/chamber environment. The system was first evacuated to a base pressure of 10$^{-5}$ Torr using a diffusion pump. The $CF_4$ gas was then introduced to the system and a pressure of 100 mTorr was established by adjusting the opening of a throttle valve placed between the diffusion pump and the chamber. After a stabilization period of several minutes, the plasma was initiated. The treatment was performed at a power of 100W, a pressure of 100 mTorr, and a gas flow rate of 50 sccm for 5 minutes. (See "In-situ and real-time monitoring of plasma-induced etching of PET and acrylic films", M. K. Shi, G. L. Graff, M. E. Gross, and P. M. Martin, Plasmas and Polymers, in press). The advancing contact angle of water on the plasma treated substrate was greater than 110°.

Figure 18:
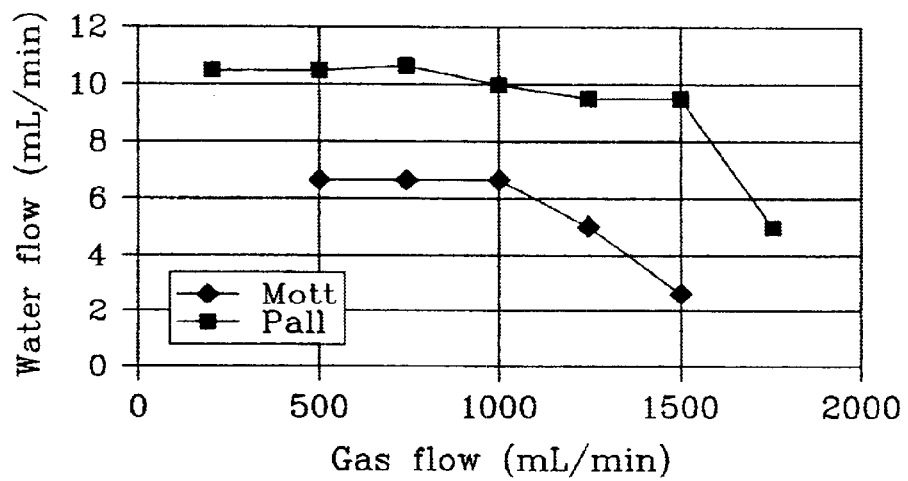
FIG. 18 is a data plot from the Examples showing maximum water flow rate with no entrainment as a function of gas flow rate.

The half inch and quarter inch polycarbonate pieces were bolted together and sealed with an o-ring such that the 3000 μm channel and hydrophobic surface faced each other. The device volume was 90 cm$^3$. The device was situated so that the liquid outlet faced downwards. A 3" piece of ⅛" tubing was attached to the liquid outlet to provide suction by siphoning. The fitting in the ½" polycarbonate piece above the liquid outlet served as the gas outlet, while the other fitting in the ½" polycarbonate served as the inlet to a mixture of air and water. Various flows of air were fed to the device. The water flow rate was adjusted to the maximum flow that allowed no entrainment of water in the gas exit line. This maximum flow is plotted as a function of gas flow rate (indicated as Mott in FIG. 18). As can be seen, the maximum water flow rate was constant at roughly 6.5 milliliters/min (mL/min) between the air flow rates of 500 and 1250 mL/min. Significant entrainment of the liquid occurred at 1500 mL/min air flow rate, until the liquid flow rate was decreased to 2.6 mL/min. No gas was observed to exit the liquid channel. Given that the working volume of the channels is 4.8 cm$^3$, the residence time is 0.2 seconds at the highest flow rate.

Example 2

Is The device was the same as above, except a 1400 μm channel replaced the 3000 μm channel. This channel had a 8 cm×2 cm piece of 0.0011" Supramesh from Pall Corporation placed in the bottom. This material consists of sintered stainless steel overlying a fine stainless mesh. Flat gasket material with a 1.5 cm×7.5 cm hole placed inside the channel served to seal both pieces of polycarbonate together as well as preventing gas intrusion into the porous material.

Again, the gas flow rate was plotted against the maximum liquid flow rate that allowed no entrainment of water in the gas exit line. These data are indicated as Pall in FIG. 18. As can be seen, the water flow rate was close to 10 mL/min between the air flow rates of 200 and 1500 mL/min. At a gas flow rate of 1750 mL/min, entrainment occurred in the air exit until the liquid flow was decreased to 5 mL/min.

A comparison of the efficiency of this device with a typical centrifugal separator demonstrates the economy of size and weight of this invention. A known fuel processing stream contains 355 L/min of gas with 300 mL/min water. The size of a type T cast iron gas/liquid separator from Wright-Austin to treat this stream would be approximately 2100 cm$^3$ and weigh 14 pounds. The residence time within the device is 0.35 seconds. In contrast, the invention would have a working volume of approximately 450 cm$^3$ giving a residence time of 0.08 seconds. The pressure drop across the Wright—Austin system is estimated to be 1.38 inches of water, while the pressure drop across the invention is estimated to be 0.075 inches of water.

CLOSURE

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A process of separating fluids comprising:

passing a mixture of at least two fluids, comprising a first fluid and a second fluid, into a device comprising a fluid opening and at least one channel;

the channel comprising an open area and a wick, wherein the first fluid is sorbed by the wick;

wherein the open area is a contiguous open area adjacent the wick such that a gas can travel through the open area from the fluid opening to a gas exit;

wherein a capture structure is disposed within the open area;

wherein, in the wick, the first fluid is a liquid that travels to a liquid exit; and wherein the first fluid exits the device through the liquid exit;

wherein the second fluid is a gas that passes through the open area to a gas exit, and wherein the gas exits the device through the gas exit.

2. The process of claim 1 wherein the liquid, without leaving a wick, travels through the wick to a wick in the liquid exit.

3. The process of claim 1 wherein the liquid passes through the wick to a liquid flow channel, and subsequently flows through the liquid flow channel to the liquid exit.

4. The process of claim 1 wherein the device further comprises a pore throat and the liquid flows through the pore throat prior to exiting the device.

5. The process of claim 4 wherein the pore throat is direct contact with the wick.

6. The process of claim 1 wherein the open area is at least partly defined by a wall that is nonwetting for said first fluid.

7. The process of claim 1 wherein the open area is a microchannel.

8. The process of claim 2 wherein said first fluid is water and said second fluid is selected from the group consisting of carbon monoxide, carbon dioxide, methane and hydrogen.

9. A process of contacting fluids comprising:

passing at least two separate fluid streams into a device having at least one channel;

wherein the channel comprises an open area and a wick and an interface between the wick and the open area;

wherein the wick has a width, length and height that are mutually perpendicular, wherein the height is perpendicular to the interface, and wherein the height of the wick is at least five times smaller than the width of the wick and wherein the height of the wick is at least five times smaller than the length of the wick;

wherein at least one fluid flows through the wicking region, and at least one other fluid flows through the open area;

wherein, at the interface between the wick and the open area, one fluid contacts at least one other fluid; and further wherein there is mass transfer occurring through the interface between the at least one fluid flowing through the wick, and the at least one other fluid flowing through the open area.

10. The process of claim 9 wherein the liquid travels through a wick until the liquid exits the device.

11. The process of claim 9 wherein the open area comprises a microchannel that is at least partly defined by a wall that is nonwetting for said first fluid.

12. The process of claim 9 wherein the open area comprises a microchannel and wherein fluid flow in the open area is in the direction opposite liquid flow in the wick.

13. The process of claim 12 wherein the device further comprises a microchannel heat exchanger that is in thermal contact with the open area.

14. A process of condensing a liquid comprising:
passing a gas through at least one fluid inlet into at least one channel of a device; wherein said at least one channel is in thermal contact with at least one microchannel heat exchanger;
passing a heat exchange fluid through at least one heat exchanger inlet and through said at least one microchannel heat exchanger;
wherein the at least one fluid inlet is separate from the at least one heat exchanger inlet;
wherein heat is transferred between the at least one channel and the heat exchanger;
wherein at least a portion of said gas is condensed to a liquid within the channel;
the channel comprising an open area and a wick, wherein said condensed liquid is sorbed by the wick; and
wherein said condensed liquid in the wick travels to a liquid exit; and wherein the condensed liquid exits the device through the liquid exit.

15. The process of claim 14 wherein the heat transfer coefficient of the condensing fluid is less than the heat transfer coefficient of the heat exchange fluid.

16. The process of claim 14 comprising passing a gas into at least two channels of a device;
wherein each of the two channels comprise an open area and a wick;
wherein a microchannel heat exchanger is disposed between the two channels; and
exchanging heat between the heat exchanger and each of the two channels.

17. An apparatus comprising;
a fluid opening and at least one channel;
the channel comprising an open area and a wick;
the wick in the channel is connected to an exit wick;
wherein the open area is connected to a gas exit; and
wherein the open area is a contiguous open area adjacent the wick such that a gas can travel through the open area from the fluid opening to the gas exit.

18. A liquid condenser comprising:
a laminated device comprising at least two channels;
wherein each of said at least two channels comprise a gas flow channel and a wick; and wherein each of said at least two channels are in thermal contact with at least one microchannel heat exchanger.

19. A chemical reactor comprising the apparatus of claim 17.

20. A chemical reactor comprising the condenser of claim 18.

21. The process of claim 14 wherein the heat exchange fluid flows through said at least one microchannel heat exchanger in a direction perpendicular to the direction of flow of gas in said at least one channel.

22. The process of claim 14 wherein the heat exchange fluid flows through said at least one microchannel heat exchanger in a direction opposite to the direction of flow of gas in said at least one channel.

23. The process of claim 9 wherein a chemical reaction occurs in said at least one channel.

24. The process of claim 23 wherein said chemical reaction comprises a Fischer-Tropsch synthesis reaction.

25. The process of claim 23 wherein said chemical reaction is a dehydrogenation reaction.

26. The process of claim 23 wherein said chemical reaction comprises a hydrocarbon reforming reaction.

27. A process of separating fluids comprising:
passing a mixture of at least two fluids, comprising a first fluid and a second fluid, into a device having at least one channel;
the channel comprising an open area and a wick, wherein the first fluid is sorbed by the wick;
wherein the open area is a microchannel;
wherein, in the wick, the first fluid is a liquid that travels to a liquid exit; and wherein the first fluid exits the device through the liquid exit;
wherein the second fluid is a gas that passes through the open area to a gas exit, and wherein the gas exits the device through the gas exit.

28. A process of separating fluids comprising:
passing a mixture of at least two fluids, comprising a first fluid and a second fluid, into a device comprising a fluid opening and at least one channel;
the channel comprising an open area and a wick, wherein the first fluid is sorbed by the wick;
wherein the open area is a contiguous open area adjacent the wick such that a gas can travel through the open area from the fluid opening to a gas exit;
wherein the wick has a width, length and height that are mutually perpendicular, wherein the height is perpendicular to the interface of the wick and the open area, and wherein the height of the wick is at least five times smaller than the width of the wick and wherein the height of the wick is at least five times smaller than the length of the wick;
wherein the open area comprises a height of about 5 $\mu$m to 5 mm that is perpendicular to the interface of the wick and open area;
wherein, in the wick, the first fluid is a liquid that travels to a liquid exit; and wherein the first fluid exits the device through the liquid exit;
wherein the second fluid is a gas that passes through the open area to a gas exit, and wherein the gas exits the device through the gas exit.

29. The apparatus of claim 17 wherein the wick in the channel comprises a gradient material; wherein the gradient material is graded by pore size or wettability to help drain liquid in a desired direction.

30. The apparatus of claim 18 wherein the wick comprises a gradient material; wherein the gradient material is graded by pore size or wettability to help drain liquid in a desired direction.

31. The apparatus of claim 17 wherein the wick in the channel is selected from the group consisting of sintered metals, metal foams, and polymer fibers.

32. The apparatus of claim 18 wherein the wick is selected from the group consisting of sintered metals, metal foams, and polymer fibers.

33. The apparatus of claim 18 wherein the wick is selected from the group consisting of sintered metals, metal foams, and metal screens.

34. The apparatus of claim 18 wherein the wick comprises microchannels having a depth of 1 to 1000 $\mu$m.

35. The apparatus of claim 34 herein the wick comprises microchannels having a width of 1 to 100 $\mu$m.

36. The apparatus of claim 18 wherein the wick comprises microchannels having a width of 1 to 1000 $\mu$m.

37. The apparatus of claim 17 wherein the wick in the channel comprises microchannels having a depth of 1 to 1000 $\mu$m.

38. The apparatus of claim 18 wherein the wick comprises microchannels that form a mouth to a larger diameter pore for liquid transport.

39. The apparatus of claim 18 further comprising a fluid inlet and a liquid outlet.

40. The apparatus of claim 39 wherein a pore throat is provided between the wick and the liquid outlet.

41. The apparatus of claim 40 wherein the pore throat has a pore size that is less than half that of the wick.

42. The apparatus of claim 41 wherein the pore throat is in capillary contact with the wicking material.

43. The apparatus of claim 17 comprising a capture structure in the open area.

44. The apparatus of claim 43 herein the capture structure comprises cones that protrude from the wick.

45. The apparatus of claim 18 comprising a capture structure in the open area.

46. The apparatus of claim 45 wherein the capture structure comprises cones that protrude from the wick.

47. The process of claim 1 wherein the capture structure is selected from the group consisting of: cones, a liquid-nonwetting porous structure having a pore size gradient with pore sizes getting larger toward the wick, and a liquid-wetting porous structure having a pore size gradient with pore sizes getting smaller toward the wick.

48. The process of claim 1 wherein the capture structure comprises cones.

49. The process of claim 1 wherein the mechanisms for liquid capture are selected from the group consisting of: impingement, Brownian capture, gravity, centrifugal forces, or electrical or sonic fields that induce aerosol particle motion.

50. The process of claim 1 wherein the mechanism for liquid capture comprises impingement.

51. The apparatus of claim 18 wherein the channel comprises a nonwetting surface.

52. The process of claim 14 wherein water from the waste stream of a fuel cell is condensed.

53. The process of claim 14 wherein the at least one channel has a channel wall adjacent to the heat exchanger; wherein the channel has reduced or non-wettability that precludes formation of a liquid film.

54. The appartus of claim 18 comprising between 4 and 40 channels, each of which comprises a gas flow channel and a wick.

55. The apparatus of claim 18 wherein said at least two channels are essentially planar.

56. The apparatus of claim 55 wherein the gas flow channels have dimensions of height, length and width, wherein height is perpendicular to the direction of net gas flow during operation of the apparatus, and wherein the length and width are at least 10 times larger than the height.

57. The apparatus of claim 56 wherein the height of the gas flow channels is 10 $\mu$m to 5 mm.

58. The apparatus of claim 56 wherein the height of the gas flow channels is 100 $\mu$m to 1 mm.

59. The apparatus of claim 57 wherein the ratio of the surface area of the wick to volume of gas flow channel is from 1 to 1000 $cm^2:cm^3$.

60. The apparatus of claim 57 wherein the ratio of the surface area of the wick to volume of gas flow channel is from 5 to 100 $cm^2:cm^3$.

61. The apparatus of claim 17 Wherein the open area has dimensions of height, length and width, wherein height is perpendicular to the direction of net gas flow during operation of the apparatus, and wherein the height of the open area is 10 $\mu$m to 5 mm.

62. The apparatus of claim 61 wherein the ratio of the surface area of the wick to volume of open area is from 1 to 1000 $cm^2:cm^3$.

63. The apparatus of claim 55 wherein lands support the gas flow channels.

64. The process of claim 1 wherein suction is used to transport fluid through the wick.

65. The process of claim 27 wherein suction is used to transport fluid through the wick.

66. The process of claim 9 wherein suction is used to transport fluid through the wick.

67. The process of claim 9 wherein the direction of liquid flow through the wick is counter to the direction of fluid flow through the open area.

68. The process of claim 9 wherein one component of a fluid mixture condenses in the wick.

69. The apparatus of claim 18 comprising layers that are arranged to have the repeating sequence: wick, gas flow channel, wall, microchannel layer, wall, gas flow channel, and wick.

70. The apparatus of claim 69 wherein the layers are diffusion bonded.

71. The apparatus of claim 18 comprising layers made from metal.

72. The apparatus of claim 18 comprising layers made from plastic.

73. The apparatus of claim 17 comprising catalyst material in the wick.

74. The apparatus of claim 18 comprising catalyst material in the wick.

75. The apparatus of claim 43 comprising catalyst material in the capture structure.

76. The apparatus of claim 45 comprising catalyst material in the capture structure.

77. The chemical reactor of claim 20 comprising an absorbent material in the wick that can selectively remove a reaction product.

78. The process of claim 9 wherein CO is selectively removed from the fluid flowing in the open area.

79. The process of claim 28 wherein the wick comprises microchannels having a depth of 1 to 1000 $\mu$m.

80. The process of claim 28 wherein the wick comprises microchannels having a width of 1 to 100 $\mu$m.

81. The process of claim 79 wherein the wick comprises microchannels having a width of 1 to 1000 $\mu$m.

82. The process of claim 27 wherein the ratio of the surface area of the wick to volume of gas flow channel is from 1 to 1000 cm$^2$:cm$^3$.

83. The process of claim 27 wherein the ratio of the surface area of the wick to volume of gas flow channel is from 5 to 100 cm$^2$:cm$^3$.

84. The process of claim 28 wherein the ratio of the surface area of the wick to volume of gas flow channel is from 1 to 1000 cm$^2$:cm$^3$.

85. The process of claim 28 wherein the ratio of the surface area of the wick to volume of gas flow channel is from 5 to 100 cm$^2$:cm$^3$.

86. The process of claim 14 wherein a capture structure is disposed within the open area.

87. The process of claim 86 wherein the capture structure is a random fiber mesh.

88. The process of claim 87 wherein the random fiber mesh has an asymmetric structure for inducing flow of liquid toward the wick.

89. The process of claim 86 wherein the capture structure is a regular array of structures placed in the gas flow path and causing gas to flow around said structures.

90. The process of claim 89 wherein the regular array of structures has a shape that induces flow toward the wick.

91. The process of claim 86 wherein the capture structure causes the gas to flow in a curved path causing liquid to move toward a wall or wick structure by a centrifugal force.

* * * * *

UNITED STATES PATENT AND TRADEMARK OFFICE
CERTIFICATE OF CORRECTION

PATENT NO. : 6,666,909 B1
DATED : December 23, 2003
INVENTOR(S) : TeGrotenhuis et al.

It is certified that error appears in the above-identified patent and that said Letters Patent is hereby corrected as shown below:

Column 9,
Line 54, replace "0.0011" with -- 0.011 --

Signed and Sealed this

Twenty-third Day of November, 2004

JON W. DUDAS
*Director of the United States Patent and Trademark Office*